UNITED STATES PATENT OFFICE.

STEPHEN R. ANDRES, OF TROY, NEW YORK.

IMPROVEMENT IN ARTICLES OF FOOD MADE FROM BEANS, PEAS, &c.

Specification forming part of Letters Patent No. 32,853, dated July 23, 1861; Reissue No. 1,340, dated September 9, 1862.

*To all whom it may concern:*

Be it known that I, STEPHEN R. ANDRES, of Troy, in the county of Rensselaer and State of New York, have produced a new and useful Article of Food Made from Beans, Peas, or Corn; and I do hereby declare that the following is a full, clear, and exact description of the process of manufacturing the same.

The nature of my invention consists in reducing beans, peas, or corn to flour, meal, grits, or grains by a specified process, whereby an article of food is produced especially valuable to soldiers, sailors, travelers, and to all others placed in positions where an already-cooked and easily-prepared food is of importance.

To enable others skilled in the art to put into practice my invention, I will proceed to describe the process adopted by me.

I take beans, peas, or corn of any known variety and of good quality, and, having separated them from all foreign substances and thoroughly cleansed them, soak them in cold water for about twelve hours or until they become sufficiently soft. I then remove them from the water, put them into a suitable vessel, and steam or otherwise treat them until they are cooked or boiled. I next pass them through between hollow perforated cylinders, or press them through perforated plates or wire-work, which crushes them and disintegrates their particles into flour, meal, grits, or grains, leaving them in a coral form or shape. These are then spread upon wire-cloth sieves and placed in a kiln or hot-air closet, where there is a current of heated air forced through them, whereby they are thoroughly dried. In case perforated cylinders are used, the flour or grains are removed from within them by any proper means and conveyed to the drier. If, on the other hand, the perforated plates or wire-works are employed, they may be placed directly over the wire-cloth sieves.

The article thus prepared is used as follows: If it be desired to make a soup, I take a pound of the prepared beans or peas and pour upon them a gallon of cold water, and add four or five ounces of salt pork sliced like dried beef; or the pork may be omitted, if preferred. This is then placed in a proper vessel over a slow fire at first and allowed to boil for twenty or twenty-five minutes, the compound being occasionally stirred to prevent burning. It may of course be seasoned to suit the taste of the consumer.

To make pork and beans or peas, I boil the pork first and take the water in which the pork is boiled to moisten or wet the prepared beans or peas and let them soak until they become soft to about the consistency of sponge-cake. I then add the pork to them and put the whole into the oven to bake.

It is obvious that the flour, grits, or grains of corn prepared as above may be used as hominy or converted into bread, puddings, or cake by simply adding water, and boiling and baking, and seasoning according to taste.

The article of food prepared by me possesses many advantages. It is healthy, easy of preparation on shipboard or on the march, not liable to be injured by warm or damp climates, and is by the process described reduced in bulk and weight twenty-two per cent. without loss of quality or quantity of nutriment.

Having thus described my article of food and pointed out the manner in which it is to be made and used, what I claim therein, and desire to secure by Letters Patent of the United States, is—

The manufacture of flour, meal, grits, or grains from beans, peas, or corn, substantially as and for the purposes described.

STEPHEN R. ANDRES.

Witnesses:

J. W. SHUGERT,

EDM. F. BROWN.